US 8,243,109 B2

(12) United States Patent  (10) Patent No.: US 8,243,109 B2
Baek et al.  (45) Date of Patent: Aug. 14, 2012

(54) RESOLVING IMAGE / DATA MISMATCH VIA ON-OFF PATTERN

(75) Inventors: Hanwook Baek, Cumming, GA (US); William Dunn, Alpharetta, GA (US)

(73) Assignee: American Panel Corporation, Alpharetta, GA (US)

( * ) Notice: Subject to any disclaimer, the term of this patent is extended or adjusted under 35 U.S.C. 154(b) by 804 days.

(21) Appl. No.: 12/206,372

(22) Filed: Sep. 8, 2008

(65) Prior Publication Data
US 2009/0251473 A1 Oct. 8, 2009

Related U.S. Application Data

(60) Provisional application No. 61/041,742, filed on Apr. 2, 2008.

(51) Int. Cl.
*G09G 5/02* (2006.01)
(52) U.S. Cl. ........... 345/698; 345/699; 345/3.3; 345/3.4
(58) Field of Classification Search .................. 345/519, 345/698–699, 90, 3.3–3.4
See application file for complete search history.

(56) References Cited

U.S. PATENT DOCUMENTS

| 6,088,062 | A  | * | 7/2000  | Kanou et al. ............... 348/441 |
| 6,384,828 | B1 | * | 5/2002  | Arbeiter et al. ............ 345/472.2 |
| 6,781,586 | B1 | * | 8/2004  | Ohta ........................... 345/505 |
| 6,812,935 | B1 | * | 11/2004 | Joe et al. ..................... 345/660 |
| 7,084,842 | B2 | * | 8/2006  | Kim et al. ..................... 345/87 |
| 2005/0128169 | A1 | * | 6/2005  | Kang et al. .................... 345/87 |
| 2005/0140700 | A1 | * | 6/2005  | Van Der Vleuten et al. .. 345/698 |

* cited by examiner

*Primary Examiner* — Alexander Eisen
*Assistant Examiner* — Sanjiv D Patel
(74) *Attorney, Agent, or Firm* — Standley Law Group LLP

(57) ABSTRACT

A two-dimensional panel, particularly a liquid crystal display device, has a maximum display area with a width of (T×M) addressable channels. The addressable channels are addressed through a plurality of T source channel integrated circuits (ICs), with each source channel IC having M source channels. The number of addressable channels exceeds the number of channels of data in an image display data array having a width of W pixels, each pixel comprising P subpixels in the width dimension. The excess addressable channels are distributed symmetrically across the width dimension of the displayed image. In other embodiments the number of addressable channels is less than the number of channels of data and excess channels of data are excluded symmetrically across the width dimension of the displayed image. Further embodiments distribute excess addressable channels symmetrically across the height dimension or exclude excess channels of data symmetrically across the height dimension.

20 Claims, 2 Drawing Sheets

RESOLVING IMAGE / DATA MISMATCH VIA ON-OFF PATTERN

CROSS-REFERENCE TO RELATED APPLICATIONS

This application is a non-provisional patent application and claims priority to application No. 61/041,742 filed Apr. 2, 2008.

TECHNICAL FIELD

Exemplary embodiments relate to image manipulation and resizing involving a liquid crystal display, and more specifically, a method of expanding an image to distribute dummy channel lines across the width and height of the display. Further embodiments shrink an image and distribute excluded image data across the width and height of the display.

BACKGROUND

A fundamental difference between the display of a digital image on a printer and on a liquid crystal display is that the resolution of the printer may be changed without changing the size of the image, but a change in the resolution of the LCD results in a corresponding change in the height and width of the image, because the size of a picture element ("pixel") on an LCD is fixed by the circuitry on the display.

There are three important elements involved in the display of a digital image on an LCD panel. The first of these is LCD panel itself. In a flat panel LCD, as to which this application pertains, a substantially rectangular screen area is divided into a large number of individual color dots, each color dot being positioned at an intersection of a row and a column electrode. A set of these color dots comprises a pixel, and the terms "color dot set" and "pixel" should be understood as being equivalent in this specification. Each set of color dots is capable of displaying a full color gamut. There are many combinations of color dot sets, but the most common sets are: a strip of three dots in a three column, one row matrix of red, green and blue color dots, a four-dot combination of red, green, green and blue arranged in a two column, two row matrix; a four-dot combination of red, green, blue and white, also arranged in a two column, two row matrix; and a six-dot combination of red, green, blue, yellow, cyan and magenta, usually arranged in a three column, two row matrix.

In an active matrix flat panel LCD, each color dot contains a transistor switch. A liquid crystal fluid, contained between a front plate and a rear plate, is twisted by a voltage which changes the axis of polarization of light, allowing the individual color dots to either transmit or not transmit light passing from a backlight source through the individual color filters. In the known art, each color dot in a pixel is driven by electrical impulses fed to its row and column address by the electrodes. In the typical embodiment, a gray scale impulse is received along the column electrode and this gray scale impulse sets the degree of twist of the liquid crystal fluid, thereby setting the amount of light allowed to pass from the backlight source through the color filter. The column electrodes are generally referred to as the source channels. The row electrodes, which are generally referred to as the gate channels, provide a timed impulse to a capacitor associated with the transistor of a given color dot, turning it from "off" to "on" for a "line time". It is during this line time that the gate driver signal determines the voltage that will be held by the color dot transistor for an entire frame period, that is, until the gate driver sends a subsequent signal down the row to refresh the capacitor charge. Since only one row is receiving the gate signal at a time, only one color transistor in a column is receiving a gray scale impulse at a time. By repeatedly scrolling through the rows and delivering gray scale impulses along the columns, a color image is displayed on the LCD.

The second element involved in the digital display is the bus hardware that delivers the row and column impulses in a precisely timed manner to the row and column electrodes. One well known device for delivering such impulses to the electrodes is the so-called tape-actuated bonding, or TAB. These TABs contain integrated circuitry and each one is capable of being connected with a fixed number of rows or columns. TABs come in standard off-the-shelf sizes, the size being primarily set by the number of channels which it may address. Because pixels tend to be either two or three columns wide, TABs tend to have a number of channels that is evenly divisible by six, as such a design allows use with both two- and three-column pixels. Two commonly used TABs have 384 and 480 channels, respectively. Clearly, it is advantageous to attach an integral number of identically-sized TABs along one of the side edges and one of the top and bottom edges, to deliver the respective row and column impulses.

The third, but far from least important, element involved in the display of a digital image is the two-dimensional digital data array that comprises the image itself. Arranged by rows and columns, the digital data array contains a gray scale value for each row and column of a single frame of the image. When the gray scale data for a given pixel on the LCD is delivered along the column electrodes through the appropriate column (source) TAB at the time when the associated row electrode is transmitting an "on" signal to the given pixel through the row (gate) TAB, the result is the digital image contained in the digital data array. The storage and refreshing of the digital data in the digital data array is a known technology that will be familiar to one of ordinary skill in this art without being repeated here.

As may be expected, a specific digital data array may need to be displayed in a variety of different LCDs, so the designer of the LCD, in order to display the full image, selects a panel with a set of source and gate TABs attached thereto, where the number of source channels is larger than the number of columns in the data array and the number of gate channels is larger than the number of rows in the data array. This excess of each type of channel is generally referred to as the number of "dummy" channels. Existing solutions have amassed these dummy channels in a few different configurations. In one solution, the excess dummy channels in each direction are divided into two blocks, with one block placed at the respective ends of the display. This technique places an inactive "frame" area around the active image. In a second solution, all the dummy channels in a direction are placed in a single block at one end of the display, resulting in an "L" shape of inactive area adjacent to the active image.

While it will be easily recognized that existing techniques do not provide an attractive presentation of the image on the LCD, and in fact, does not fully utilize the size dimensions of the panel used.

It is therefore an unsolved need to expand a digital image display generated from a digital data array to fill an available display panel, even when the display panel exceeds, in number of pixels, the size of the digital data array provided, especially by up to a factor of about 20% in at least one dimension of the array.

SUMMARY OF THE EXEMPLARY EMBODIMENTS

This and other aspects of the invention are achieved by a method for resizing at least one dimension of a two-dimensional image to fill a display area. The method has the steps of: 1) providing a two-dimensional array of image display data; 2) providing a two-dimensional display panel where a number of addressable channels in at least one of the two dimensions exceeds the number of total array subpixels in the display data array; and 3) distributing said excess addressable channels symmetrically across the at least one dimension.

Other aspects of the invention are achieved by a two-dimensional panel for displaying a two-dimensional array of image display data having a width of W pixels, each pixel comprising P subpixels in the width dimension. Such a panel has a liquid crystal display device with a maximum display area having a width of (T×M) addressable channels. The addressable channels are addressed through a plurality of T source channel integrated circuits (ICs), with each source channel IC having M source channels. The (T×M) addressable channels exceed the (W×P) channels of data in the image display data array by a plurality D of excess source channels, which are then distributed symmetrically across each of said T source channel ICs in said first panel dimension.

BRIEF DESCRIPTION OF THE DRAWINGS

Exemplary embodiments will be better understood by reference to the following detailed description of a preferred embodiment and the accompanying drawings, wherein identical reference numerals identify identical elements and wherein.

DETAILED DESCRIPTION OF A PREFERRED EMBODIMENT

Figure 1:
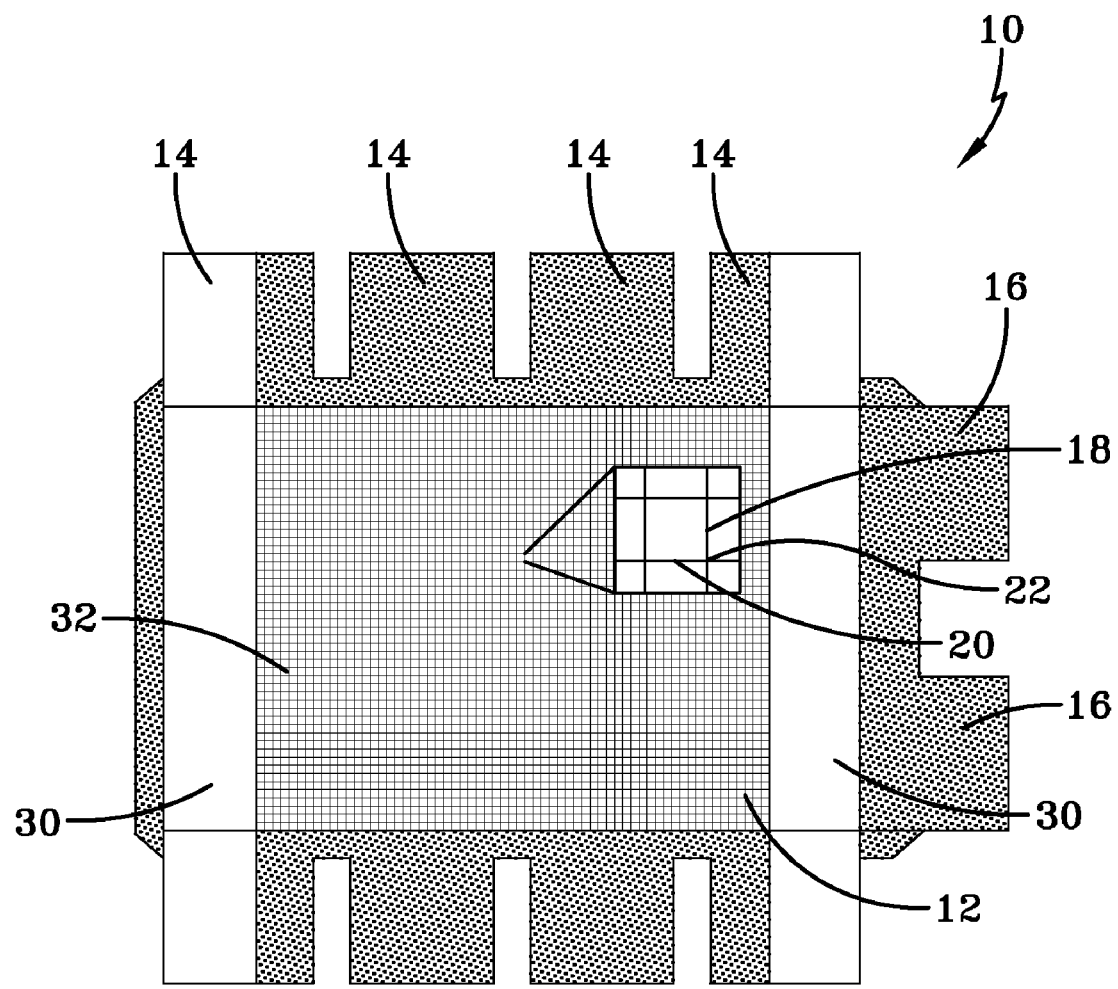
FIG. 1 shows a top view of an existing liquid crystal display device.

FIG. 1 shows an idealized depiction of a flat panel display device 10 as is generally known, for illustrating the problem solved by exemplary embodiments. The display device 10 has a maximum image area 12 that is addressed by a plurality of T column TABs 14 and Y row TABs 16, which are positioned along a pair of adjoining edges of the device 10. Each column TAB 14 has a total of M addressable channels and each row TAB 16 has a total of Z addressable channels. As a result, the maximum image area 12 is characterized by a width of (T×M) columns and a height of (Y×Z) rows. These columns and rows are further characterized by (T×M) column electrodes 18 and (Y×Z) row electrodes 20, the intersections 22 of such electrodes each comprising a color dot in a liquid crystal display (LCD) array, so the terms "electrode intersection" and "color dot" are effectively synonymous in this specification. An enlarged portion of the image area 12 is provided to better illustrate the column and row electrodes 18, 20, as well as the intersections 22, although these are believed to well known in the art.

To address a particular color dot 22, a gate voltage is applied to a specific row electrode 20 by one of the row TABs 16. In known LCD technology, as described above, the gate voltage switches a transistor at each color dot 22 to an "on" condition, allowing it to accept a charge. Voltages are simultaneously applied to each column electrode 18 across the width of the image area 12. These column voltages each represent a gray scale value for one of the (T×M) color dots 22 located along the column electrodes 18 intersecting the particular row 20. Since the color dots 22 on that row 20 are "on", the column voltage is received and the color dot is activated at the particular gray scale value. By scanning through the (Y×Z) rows 16 of the image area 12, a visual image is continuously formed and refreshed. As described above, the individual color dots 22 co-act in predetermined groups of P columns and y rows to provide the pixels. To provide an integral number of pixels in the image, P is a divisor of (T×M) and y is a divisor of (Y×Z). To assure that each pixel is not divided between column TABs 14, P is also a divisor of M.

The visual images presented on the image area 12 of the device 10 originate as digital display arrays, which are two-dimensional matrices of gray scale values corresponding to the color dots 22 on the image area. In the ideal case, the digital data arrays are (T×M) by (Y×Z) matrices. But, as in the situation shown in FIG. 1 illustrates, sometimes there are fewer than (T×M) columns of gray scale data in a digital display array. This means that the width of the maximum image area exceeds the width of the digital display array by D channels, which are referred to as the "dummy channels." In general, D will be less than M, the number of channels in any one of the column TABs 14. From this, it is clear that there will be (W×P) "active" or "valid" channels in the digital display array, where W is the number of horizontal pixels, with each horizontal pixel comprising P color dots.

In one known method, as illustrated in FIG. 1, the smaller width of the digital display array is accommodated in the maximum image area 12 by simply centering the available data. In other words, each row of the maximum image area 12 has, when viewed from side to side, a first set of D/2 dummy channels, followed by (W×P) active channels and a second set of D/2 dummy channels. Since D is generally less than M, the column TABs 14 on each end of the display have at least one-half of its channels receiving active image data and the intermediate column TABs 14 are fully active in receiving image data. In this arrangement, the maximum image area 12 will comprise two rectangular bocks 30 of dead or inactive display area, one at each end of the active display area 32. In another known method, the same situation is resolved by justifying the image data to the left or right side of the maximum image area 12. In such a case, there will be D dummy channels in either the left or right end column TAB 14, with each other column TAB fully active.

Exemplary embodiments distribute the dummy channels uniformly across each column TAB 14, and, even more particularly, to distribute the dummy channels uniformly across the entire width of the maximum image area 12. This method is found to be particularly useful when the number of active channels in the digital display array is at least 80% of the number of available horizontal channels.

Figure 2:
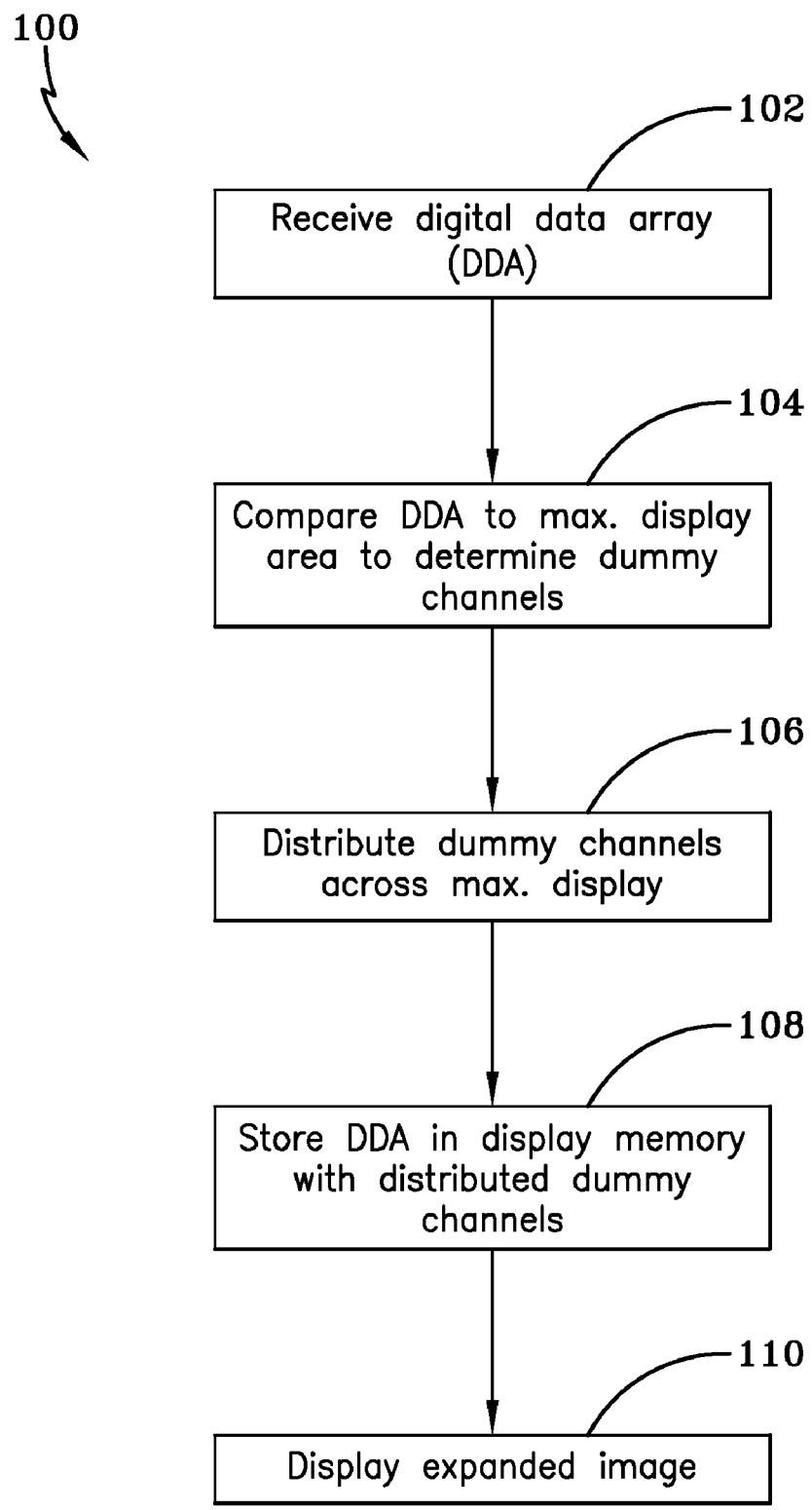
FIG. 2 shows a flow chart for distributing excess data channels across the entire available display.

FIG. 2 provides a flow chart of the method 100 practiced in exemplary embodiments. The first step 102 of the method 100 is to receive a digital data array, especially a two-dimensional digital data array having (W×P) columns of data.

The second step 104 of the method 100 is to compare the size of the digital data array to the available maximum image area to determine the number of dummy channels to be distributed. In the situation set out above, the digital data area has fewer columns than are available for display. The selected LCD panel has T column (source) TABs, each providing M channels, for a total of (M×T) channels, with M integrally divisible by P. There is a positive number D of dummy channels, as defined by the equation $$D = (M \times T) - (W \times P) \tag{1}$$

where D will generally have a value less than M.

Each of the T column TABs has a bus number N for data communication between the timing controller and the source TAB IC. N is usually 3, 4 or 6, with the exact value being set by the manufacturer as part of the specified design.

The third step 106 of the method 100 is to distribute the dummy channels across the width of the each column TAB. Knowing D from equation (1), each column TAB may be partitioned into n blocks, each block containing d dummy channels and v valid data channels. To start this, a partitioning factor A must be determined. If the bus number N is evenly divisible by the number of sub-pixels P per pixel, then:

$$A=N, \quad (2)$$

but if N is not evenly divisible by P, then $$A=N P. \quad (3)$$

This assures that the partitioning divides channels, not only integrally with regard to the bus number N, but also with regard to the pixels. Since N normally has values 3, 4 or 6 and P normally has values 2, 3 or 6, equation (2) will be used in many situations, except, for example, when N=4 and P=3, in which case equation (3) will be used. To provide a symmetrical distribution of the dummy channels, both D and D/T should be evenly divisible by A. Since each column TAB has M channels, there are three partitioning equations of interest:

$$M=n(d+v) \quad (4)$$

$$D=n \, d \, T \quad (5)$$

and $$W=n \, v \, T. \quad (6)$$

These three equations are solved to determine the three variables n, d and v. In arriving at a solution, there are two desired conditions: d should be as small as possible (to minimize the number of adjacent dummy channels); and d and v both should be divisible by A. This latter condition can be expressed algebraically as follows:

$$d=A \, d' \quad (7)$$

and $$v=A \, v'. \quad (8)$$

When a solution of the equations is made, a partitioning of the dummy channels is provided so that the dummy channels are evenly distributed across each column TAB and across each block of each column TAB.

The fourth step 108 is to assign the received digital display array data in its expanded form to a memory array associated with the column TABs. From this point, the fifth step 110 is to use the expanded data to display the expanded image on the image area of the device.

It is observed in practice that the image displayed is not distorted if the number of dummy channels is less than about 20% of the total channels, that is, that there is only one channel turned off for every four that are used.

The method 100 is now further illustrated by presenting a series of examples that incorporate the method.

EXAMPLE 1

A provided digital display array is 520 pixels wide by 400 pixels high. Each pixel comprises a strip of three color dots (red, green, blue) in a three column, one row matrix. Therefore, the array provides 1560 columns and 400 rows of gray scale data. The display array data are to be spread out onto an image array having a larger number of pixels.

To accommodate the image display on an LCD using conventional source TABs for the columns, an LCD panel is selected that has four column TABs, each providing 480 channels, for a total of 1920 total column channels. Each of the selected column TABs has a bus number N of 6. Applying equation (1) the number of total dummy column channels D is determined:

$$D=(480\times4)-(520\times3)=360$$

Using existing methods, these 360 dummy column channels would either be divided into two groups of 180 each and placed at the respective ends of the two outermost source TABs, or would be grouped together in the first or last source TAB.

Since the bus number N of 6 is evenly divisible by the number P of sub-pixels per pixel, equation (2) applies and the partitioning factor A is determined, that is:

$$A=N=6.$$

The number of total dummy column channels D is evenly divisible by the total number of column TABs T, that is:

$$D/T=360/4=90$$

and the number of total dummy column channels per column TAB is evenly divisible by the partitioning factor A, since $$(D/T)/A=90/6=15.$$

With this knowledge, the total column channels M in each column TAB are divided evenly among n blocks, so that there are d dummy channels and v valid channels in each block, using equations (4) through (6):

$$480=n(d+v)$$

$$360=4nd$$

and $$1560=4nv.$$

Solving the latter two equations for n, then, $$90 \, v=390 \, d$$

which may be factored to $$3 \, v=13 \, d$$

or, more conveniently $$v=(13d)/3.$$

Then using equation (7) to substitute for d, this result may be restated as:

$$v=13 \cdot 6 \cdot d'/3=26 \, d'.$$

When d' is 1, then d=6 and v=26, but v is not is not evenly divisible by A, which is 6. However, when d' is 3, then d=18 and v=78, both of which are evenly divisible by A. Since there are d+v, or 96, channels in each block, then there are M/(d+v), or 5, blocks per column TAB.

From this, it is clear that the 480 channels per column TAB can be divided into 5 blocks of 96 channels, with each block containing 18 dummy channels and 78 valid channels, and less than 20% of the total channels of the display are turned off.

EXAMPLE 2

The same digital display array of Example 1 is provided, but a different LCD panel is selected. In this instance, the LCD panel selected has five conventional column TABs for the columns, each column TAB providing 384 channels, for the same total of 1920 total column channels as in Example 1. Each of the column TABs has a bus number N of 4, instead of 6 as in Example 1. As in Example 1, applying equation (1)

indicates that there will be 360 dummy channels in the column TABs since:

$$D=(384\times5)-(520\times3)=360$$

As in Example 1, the existing solutions either divide these 360 dummy source channels into two groups of 180 each and place them at the respective ends of the two outermost source TABs, or group all 360 together in the first or last column TAB, which would leave that column TAB with almost 94% of its channels unused.

Unlike Example 1, the bus number N is not evenly divisible by the number P sub-pixels per pixel, so the partitioning factor A is calculated using equation (3) instead of equation (2), that is:

$$A=N\times P=4\times3=12.$$

The number of dummy channels D may be evenly divided across the total number of column TABs T, that is:

$$D/T=360/5=72$$

and the number of dummy channels per column TAB may be evenly divided by the partitioning factor A, since $$(D/T)/A=72/4=18.$$

The next step is to divide the total channels M in each column TAB evenly among n blocks, so that there are d dummy channels and v valid channels in each block. For this calculation, applying equations (4) through (6) provides:

$$384=n(d+v)$$

$$360=5nd$$

and $$1560=5nv.$$

Solving the latter two equations for n, then, $$72\ v=312\ d$$

which may be factored to $$3\ v=13\ d$$

or, more conveniently $$v=(13d)/3$$

While this appears identical at first to the same point in Example 1, the solution will be different, because the solutions for d and v must be divisible by A, which equals 12 in this case instead of 6. Using equation (7), this is restated as:

$$v=13\cdot12\cdot d'/3=52\ d',$$

so when d'=1, then d=12 and v=52, which is not divisible by 12. But when d'=3, then d=36 and v=156, both of which are divisible by 12.

From this, it is seen that the 384 channels per column TAB are divided into 2 blocks of 192 channels, with each block containing 36 dummy channels and 156 valid channels. The number of dummy channels per block is again less than 20%.

EXAMPLE 3

The digital display array is now 800 pixels wide, with each pixel comprising a quad of two horizontal color dots and two vertical color dots. Therefore, the array requires 1600 channel columns for display.

The same LCD panel as in Example 1 is selected, that is, an LCD panel with four conventional source TABs for the columns, each column TAB providing 480 channels, for the same total of 1920 total column channels. Each of the column TABs has a bus number N of 4. Applying equation (1), it is determined that there will be only 320 dummy channels in the column TABs since:

$$D=(480\times4)-(800\times2)=320$$

Using an existing method, these 320 dummy column channels would either be divided into two groups of 160 each and placed at the respective ends of the two outermost source TABs, or would be grouped together in the first or last source TAB.

As in Example 1, the bus number N is evenly divisible by the number P of sub-pixels per pixel, so equation (2) defines partitioning factor A:

$$A=N=4.$$

It is clear that the number of dummy channels D may be evenly divided across the total number of source TABs T, that is:

$$D/T=320/4=80$$

and also that the number of dummy channels per column TAB may be evenly divided by the factor A, since $$(D/T)/A=80/4=20.$$

The next step is to divide the total channels M in each column TAB evenly among n blocks, so that there are d dummy channels and v valid channels in each block. For this calculation, equations (4) through (6) are used:

$$480=n(d+v)$$

$$320=4nd$$

and $$1600=4nv.$$

Solving the latter two equations for n, then, $$80\ v=400\ d$$

which may be factored to $$v=5d$$

Using equation (7), this may be restated as:

$$v=20d',$$

so that when d'=1, d=4 and v=20, each of which is divisible by A.

From this, it is clear that the 480 channels per column TAB are divided into 20 blocks of 24 channels, with each block containing 4 dummy channels and 20 valid channels. As in the prior examples, less than 20% of the total channels are turned off as dummy channels.

Not specifically illustrated is a situation where there are also dummy channels in the vertical direction, that is, there are dummy rows that need to be distributed across the height of the maximum display area 12. This exercise may be carried out in an analogous manner, although it tends to be simpler, because the number of rows per pixel is usually 1 or 2. In such an embodiment, it is also possible to distribute the image simultaneously in the vertical and horizontal directions by distributing both dummy channels in the columns and rows.

Further review of the foregoing method will reveal it to be useful in situations where the received digital data array has more columns than are available for display. In that circumstance, equation (1) yields a result that there is a negative number D of dummy channels. With D being negative, d will also be negative. In practice, this will result in the exclusion of columnar data rather than in the insertion of dummy channels. Just as the insertion of a limited number of dummy channels does not disrupt the unitary nature of the visual image, provided that the insertion does not exceed about 20%, the deletion of a similar percentage does not disrupt the unitary nature of the image.

While the foregoing description has provided a preferred embodiment of the invention, those skilled in the art will realize that many variations and modifications may be made to affect the preferred embodiments and still be within the scope of the claimed invention. Thus, many of the elements indicated above may be altered or replaced by different elements which will provide the same result and fall within the spirit of the exemplary embodiments. It is the intention, therefore, to limit the invention only as indicated by the scope of the claims.

What is claimed is:

1. A method for resizing one or more dimensions of a two-dimensional image to fill a display area, said method comprising the steps of:
providing a two-dimensional array of image display data, said array comprising W pixels in a first dimension thereof, each said pixel having P subpixels in said first dimension;
providing a two-dimensional display panel, said display panel comprising T source channel integrated circuits (ICs) in a first dimension thereof, each said source channel IC comprising M source channels, wherein the number of total display panel source channels in the first panel dimension exceeds the number of total array subpixels in the first array dimension by D excess source channels; and
distributing said D excess source channels symmetrically across said T source channel ICs and within each of the individual T source channel ICs in said first panel dimension.

2. The method of claim 1, wherein the distributing step is conducted so that:
each of said T source channel ICs has a bus number N associated with data communication between a timing controller and the source channel IC; and
D and D/T are each evenly divisible by a partitioning factor A, wherein either A equals N if N is evenly divisible by P or A equals N×P if N is not evenly divisible by P.

3. The method of claim 2, wherein the distributing step is further conducted so that:
each of the T source channel ICs has its M channels divided into n blocks, with each of the n blocks containing v valid channels and d excess source channels.

4. The method of claim 1, wherein:
the number of excess source channels D is less than or equal to 20% of the total source channels in the first panel dimension.

5. The method of claim 1, wherein:
the number of excess source channels is less than the number of source channels in any of the source channel ICs.

6. The method of claim 1, wherein:
the two-dimensional array of image display data further comprises H pixels in a second dimension, each said pixel having X subpixels in said second dimension;
the two-dimensional display panel further comprises Y source channel integrated circuits (ICs) in a second dimension thereof, each said source channel IC having Z source channels, wherein the number of total display panel source channels in the second panel dimension exceeds the number of total array subpixels in the second array dimension by E excess source channels; and the distributing step is conducted so that said E excess source channels are distributed symmetrically across each of said Y source channel ICs in said second panel dimension.

7. The method of claim 6, wherein the distributing step is conducted so that:
each of said T source channel ICs has a bus number N associated with data communication between a timing controller and the source channel IC;
D and D/T are each evenly divisible by a partitioning factor A, wherein either A equals N if N is evenly divisible by P or A equals N×P if N is not evenly divisible by P;
each of said Y source channel ICs has a bus number O associated with data communication between a timing controller and the source channel IC; and
E and E/Y are each evenly divisible by a partitioning factor B, wherein either B equals O if O is evenly divisible by X or B equals O×X if O is not evenly divisible by X.

8. The method of claim 7, wherein the distributing step is further conducted so that:
each of the T source channel ICs has its M channels divided into n blocks, with each of the n blocks containing v valid channels and d excess source channels; and
each of the Y source channel ICs has its Z channels divided into m blocks, with each of the m blocks containing w valid channels and e excess source channels.

9. A two-dimensional panel for displaying a two-dimensional array of image display data having a width of W pixels, each pixel comprising P subpixels in the width dimension, the panel comprising:
a liquid crystal display device with a maximum display area having a width of (T×M) addressable channels, the addressable channels addressed through a plurality of T source channel integrated circuits (ICs), each source channel IC having M source channels, wherein (T×M) is larger than (W×P) by a plurality D of excess source channels;
wherein the D excess source channels are distributed symmetrically across said T source channel ICs and within each of the individual T source channel ICs in said first width dimension.

10. The panel of claim 9, wherein:
each said source channel IC has the M total source channels therein evenly partitioned into a plurality of n blocks, each of the n blocks having d excess source channels and v valid data channels.

11. The panel of claim 10, wherein:
the d excess source channels are distributed symmetrically across each of the n blocks.

12. The panel of claim 9, wherein:
the number of excess source channels D is less than or equal to 20% of the total source channels in the first panel dimension.

13. The panel of claim 9, wherein:
the number of excess source channels D is less than the number of source channels M in any of the source channel ICs.

14. The panel of claim 9, wherein:
the liquid crystal display provides a unitary visual image of the image display data across the maximum display area.

15. The panel of claim 9, wherein:
the two-dimensional array of image display data additionally has a height of H pixels, each pixel comprising X subpixels in the height dimension;
said liquid crystal display device further comprises a maximum display area having a height of (Y×Z) addressable channels, the addressable channels addressed through a plurality of Y source channel integrated circuits (ICs), each source channel IC having Z source channels, wherein (Y×Z) is larger than (H×X) by a plurality E of excess source channels; and wherein the E excess source channels are distributed symmetrically across each of said Y source channel ICs in said height dimension.

16. The panel of claim 15, wherein:

each said Y source channel IC has the Z total source channels therein evenly partitioned into a plurality of m blocks, each of the m blocks having e excess source channels and w valid data channels; and each said T source channel IC has the M total source channels therein evenly partitioned into a plurality of n blocks, each of the n blocks having d excess source channels and v valid data channels.

17. A two-dimensional panel for displaying a two-dimensional array of image display data having a width of W pixels, each pixel comprising P subpixels in the width dimension, the panel comprising:

a liquid crystal display device with a maximum display area having a width of (T×M) addressable channels, the addressable channels addressed through a plurality of T source channel integrated circuits (ICs), each source channel IC having M source channels, wherein (T×M) is smaller than (W×P) by a plurality D of excess image display data;

wherein the D excess image data are excluded symmetrically across said T source channel ICs and within each of the individual T source channel ICs in said width dimension.

18. The panel of claim 17 wherein each said source channel IC has the M total source channels therein evenly partitioned into a plurality of n blocks, each of the n blocks having d excess image data excluded from the v valid data channels.

19. The panel of claim 17 wherein the two-dimensional array of image display data additionally has a height of H pixels, each pixel comprising X subpixels in the height dimension;

said liquid crystal display device further comprises a maximum display area having a height of (Y×Z) addressable channels, the addressable channels addressed through a plurality of Y source channel integrated circuits (ICs), each source channel IC having Z source channels, wherein (Y×Z) is smaller than (H×X) by a plurality E of excess image display data; and wherein the E excess image display data are excluded symmetrically across each of said Y source channel ICs in said height dimension.

20. The panel of claim 19 wherein:

each said T source channel IC has the M total source channels therein evenly partitioned into a plurality of n blocks, each of the n blocks having d excess image data excluded from the v valid data channels, each said Y source channel IC has the Z total source channels therein evenly partitioned into a plurality of m blocks, each of the m blocks having e excess image data excluded from the w valid data channels.

* * * * *